US012731432B2

(12) United States Patent
Warden et al.

(10) Patent No.: US 12,731,432 B2
(45) Date of Patent: Sep. 8, 2026

(54) LOW-RESOLUTION EMBEDDED FACE IDENTIFICATION SENSOR WITH MACHINE LEARNING

(71) Applicant: Useful Sensors Inc., Mountain View, CA (US)

(72) Inventors: Peter Charles Warden, San Francisco, CA (US); James Muyao Wang, Rosamond, CA (US)

(73) Assignee: Useful Sensors Inc., Mountain View, CA (US)

( * ) Notice: Subject to any disclaimer, the term of this patent is extended or adjusted under 35 U.S.C. 154(b) by 256 days.

(21) Appl. No.: 18/737,956

(22) Filed: Jun. 8, 2024

(65) Prior Publication Data

US 2024/0412558 A1 Dec. 12, 2024

Related U.S. Application Data

(60) Provisional application No. 63/637,418, filed on Apr. 23, 2024, provisional application No. 63/471,997, filed on Jun. 9, 2023.

(51) Int. Cl.

| | |
|---|---|
| ***G06K 9/00*** | (2022.01) |
| ***G06T 7/80*** | (2017.01) |
| ***G06V 40/16*** | (2022.01) |
| ***G06V 40/18*** | (2022.01) |

(52) U.S. Cl.

CPC .............. *G06V 40/172* (2022.01); *G06T 7/80* (2017.01); *G06V 40/161* (2022.01); *G06V 40/171* (2022.01); *G06V 40/18* (2022.01)

(58) Field of Classification Search

USPC ........ 382/100, 103, 106, 117–118, 155, 168, 382/181, 214, 254, 286, 305, 312

See application file for complete search history.

(56) References Cited

U.S. PATENT DOCUMENTS

| | | | | |
|---|---|---|---|---|
| 2016/0320932 | A1* | 11/2016 | Belhumeur | G06F 3/04842 |
| 2018/0068198 | A1* | 3/2018 | Savvides | G06V 40/161 |
| 2019/0026538 | A1* | 1/2019 | Wang | G06V 40/172 |
| 2020/0234079 | A1* | 7/2020 | Minhas | G06F 18/21 |
| 2020/0396531 | A1 | 12/2020 | Paranirupasingam | |
| 2021/0150534 | A1* | 5/2021 | Yu | H04W 12/77 |
| 2022/0147341 | A1 | 5/2022 | Thakore et al. | |
| 2022/0147874 | A1 | 5/2022 | Thakore et al. | |

(Continued)

*Primary Examiner* — Seyed H Azarian

(74) *Attorney, Agent, or Firm* — Adams Intellex, PLC

(57) ABSTRACT

Techniques for sensing faces based on capturing low-resolution images and machine learning are disclosed. One or more images are captured by a face identification sensor. The face identification sensor includes a low-resolution camera, a microcontroller, and an external memory. At least two machine learning models operate simultaneously on the microcontroller. A first neural network operating on the microcontroller detects one or more faces in the image that was captured. The detecting includes a first confidence score associated with each face in the one or more faces. A second neural network operating on the microcontroller recognizes the one or more faces, wherein the recognizing is based on a face ID. A second confidence score is assigned to each of the one or more faces that were recognized. The face ID is saved to the external memory, where the second confidence score that was assigned is below a threshold.

21 Claims, 11 Drawing Sheets

(56) References Cited

U.S. PATENT DOCUMENTS

| | | | | |
|---|---|---|---|---|
| 2022/0214677 | A1 | 7/2022 | Wong et al. | |
| 2022/0343690 | A1* | 10/2022 | Hartman ................ | G06V 40/16 |
| 2022/0405507 | A1 | 12/2022 | Verma et al. | |
| 2023/0021621 | A1 | 1/2023 | Chakrabartty et al. | |
| 2023/0147294 | A1 | 5/2023 | Sreedhar et al. | |
| 2024/0127855 | A1* | 4/2024 | Dontcheva ............. | G11B 27/02 |

* cited by examiner

LOW-RESOLUTION EMBEDDED FACE IDENTIFICATION SENSOR WITH MACHINE LEARNING

RELATED APPLICATIONS

This application claims the benefit of U.S. provisional patent applications "Low-Resolution Embedded Face Identification Sensor With Machine Learning" Ser. No. 63/471,997, filed Jun. 9, 2023, and "Low Power Passive Infrared Human Sensor With Machine Learning" Ser. No. 63/637,418, filed Apr. 23, 2024.

Each of the foregoing applications is hereby incorporated by reference in its entirety.

FIELD OF ART

This application relates generally to sensing faces and more particularly to a low-resolution embedded face identification sensor with machine learning.

BACKGROUND

Throughout history, humans have challenged each other to identify themselves to one another, to groups, and to attain safe passage, among many other purposes. These challenges were usually issued to confirm that a person belonged to a certain group, lived in a certain village, or was a friend rather than a foe, among other reasons to verify identity and relationships. An historical example challenged individuals crossing the River Jordan, ostensibly to return home, to pronounce the word "shibboleth". Those who pronounced the word as if starting with an "s" or "shibboleth", successfully identified themselves as being residents and were allowed to cross over the river safely. Those who pronounced the word "shibboleth," according to phonetic expectation, failed the test and were denied crossing. Many other forms of challenges and responses have been used extensively. Providing a password has long been a common practice in order to gain access to secure facilities, clubs, and secret societies, among many other sites and establishments. Sentries may challenge anyone they encounter while on watch to provide the password of the day, or a bouncer may demand the "Joe sent me" phrase of the day before granting passage into an after-hours establishment. Whatever the purpose of the challenge and response, access is granted or denied based on successfully answering the challenge with the correct response.

The use of passwords and other security measures to gain access has expanded significantly. In a typical day, an individual can be challenged to provide a password, a personal identification number (PIN), a code, and other alphanumeric information to stream TV shows and movies, access bank accounts, and pay bills online, among many other activities. Additional security measures have been added to the use of passwords to further control access. One technique that is gaining widespread use is two-factor authentication (2FA). Two-factor authentication requires a user to provide a password and a second piece of information. The second piece of information often includes a code that is sent to an email address or phone number that previously has been verified to be associated with and accessible by the individual. The individual accesses the code via email, voice call, or text, and provides that code as part of the login process. The use of two-factor authentication can significantly reduce fraudulent access to critical or confidential information.

SUMMARY

Advanced forms of identification based on biometrics have emerged from the pages of science fiction and secret government labs and have now become enormously popular techniques that control access to personal electronic devices, electronic resources, and physical assets such as buildings. Common forms of biometric identification include fingerprints, voice patterns, iris scans, and finger or palm vein patterns. Perhaps the most popular form of biometric identification is based on facial scans. Facial scans are now routinely used to give access to popular, personal electronic devices including tablet computers and smart phones. Facial scans to enable access to computers are also emerging, replacing fingerprint readers that are now widely used. While access to the devices is useful, many other interactions with devices can benefit from biometric sensing. The biometric sensing, such as face sensing, can be used to enhance and simplify application usage. For example, a video camera and audio microphone used while conducting a video call can be muted when the user turns to talk to someone in the room with them or steps away from their electronic device. The face sensing also can be applied to common appliances such as stoves and ovens. The face sensor can enable access to appliances by some household members while restricting access by others. Thus, some adults can be granted full access to the appliances, while children or adults who require supervision or assistance are blocked or granted limited access.

Sensing faces is enabled by a low-resolution embedded face identification sensor with machine learning. One or more images are captured by a face identification sensor, wherein the face identification sensor includes a low-resolution camera, wherein the face identification sensor includes a microcontroller and an external memory, and wherein at least two machine learning models operate simultaneously on the microcontroller. A first neural network operating on the microcontroller detects one or more faces in the image that was captured, wherein the detecting includes a first confidence score associated with each face in the one or more faces. A second neural network operating on the microcontroller recognizes the one or more faces, wherein the recognizing is based on a face ID. A second confidence score is assigned to each of the one or more faces that were recognized. The face ID is saved to the external memory, wherein the second confidence score that was assigned is below a threshold.

A processor-implemented method for sensing faces comprising: capturing one or more images by a face identification sensor, wherein the face identification sensor includes a low-resolution camera, wherein the face identification sensor includes a microcontroller and an external memory, and wherein at least two machine learning models operate simultaneously on the microcontroller; detecting, by a first neural network operating on the microcontroller, one or more faces in the image that was captured, wherein the detecting includes a first confidence score associated with each face in the one or more faces; recognizing, by a second neural network operating on the microcontroller, the one or more faces, wherein the recognizing is based on a face ID; assigning a second confidence score to each of the one or more faces that were recognized; and saving, to the external memory, the face ID, wherein the second confidence score that was assigned is below a threshold.

Various features, aspects, and advantages of various embodiments will become more apparent from the following further description.

BRIEF DESCRIPTION OF THE DRAWINGS

The following detailed description of certain embodiments may be understood by reference to the following figures wherein.

DETAILED DESCRIPTION

Figure 1:
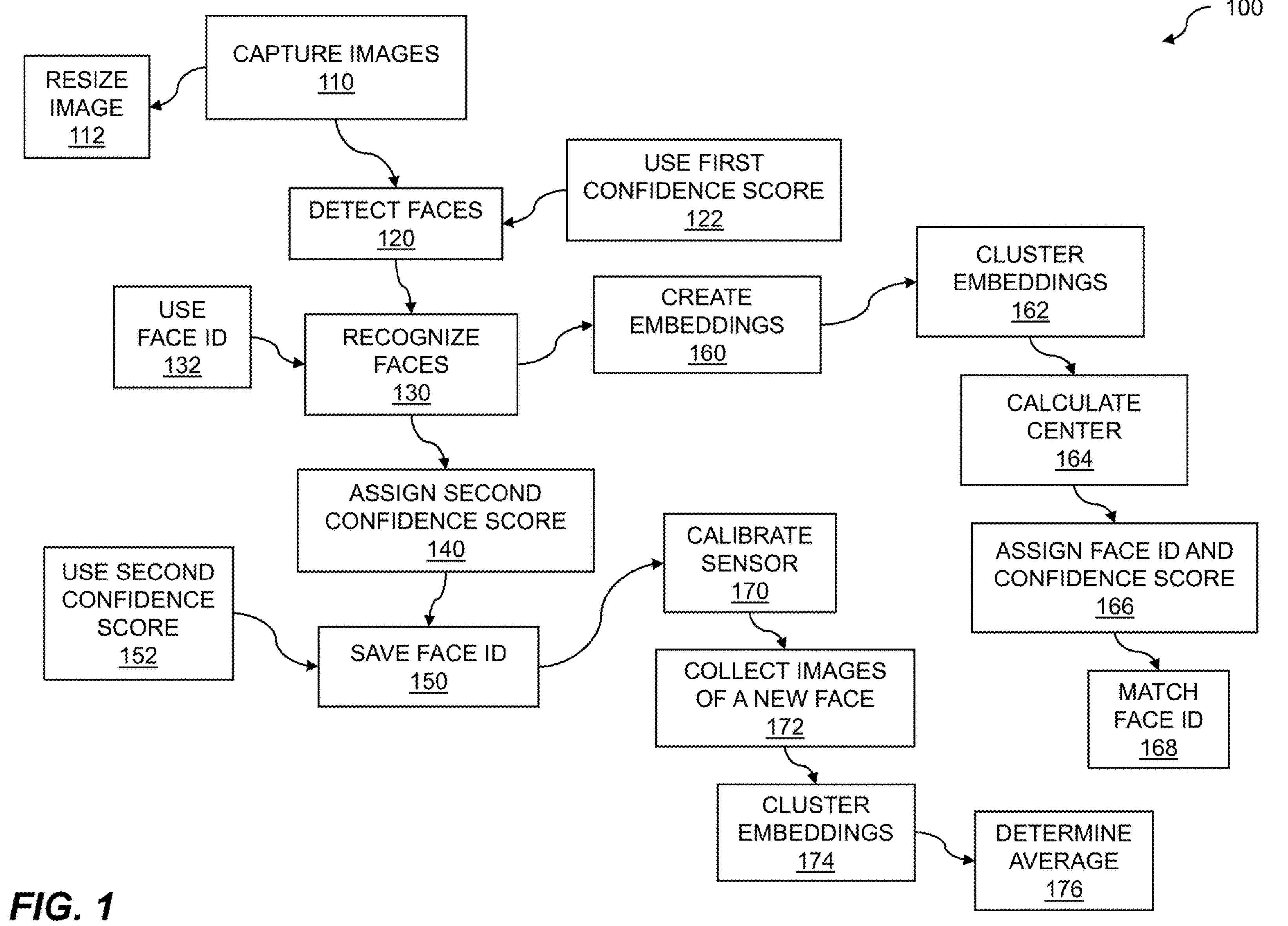
FIG. 1 is a flow diagram for a low-resolution embedded face identification sensor with machine learning.

Access to public spaces, enterprises, clubs, government buildings, airports, military bases, secret societies, and other areas, buildings, and organizations has been allowed or denied based on identification of individuals and groups who desire access. Access to these spaces, buildings, and organizations has often been allowed or blocked by requiring the individuals or groups to provide some form of identification. The identification can include a government issued ID that can be used to confirm identity, age, nationality, and other relevant information. Other forms of ID that can be used to enable or block access can include spoken passwords, secret handshakes, and other information or actions that can confirm that an individual or group has been authorized to gain access. Beyond physical spaces and organizations, access control is routinely used to gain access to popular devices such as electronic devices. Passwords, codes, and other unique identifiers have been used for many years to identify individuals or groups, and to allow the individuals or groups to "log into" the electronic devices. In addition to physical access to devices, forms of identification are used to control access to electronic assets such as file systems and networks, and other resources. Access control has also been enabled based on the physical location, job responsibilities, and qualifications of an individual.

Techniques for sensing faces are disclosed. The sensing of faces is enabled by a face identification sensor. The face identification sensor includes a low-resolution camera to capture images in which faces can be detected. The face identification sensor further includes a microcontroller and an external memory. The microcontroller enables at least two machine learning models to operate simultaneously. The models can be stored in the external memory. Other objects that can be stored in the external memory can include images, face IDs, and so on. The face identification sensor can be used for a wide variety of applications. The sensor can be coupled to or built into a variety of objects such as household appliances, consumer electronics, and the like. The addition of the face identification sensor can enable the appliances and electronics, which otherwise require manual access and control, to become "smarter" and thereby safer and more useful.

Face sensing and identification can differentiate between individuals such as members of a household. Household members can be granted different levels of access to appliances, electronic devices, and so on. In a usage example, a face identification sensor added to a kitchen appliance such as a stove, oven, or mixer can limit access to controls such as burner controls. Access can be granted to those able to operate the appliance safely and denied to those who cannot. Such limited access can prevent small children from injuring themselves by touching hot burners or getting fingers caught in spinning accessories. Further, adults who are living at home but require round-the-clock care, could turn on a stove. Based on face identification, the burner could turn off automatically if unattended or if left on for long periods of time. Other face sensing applications can add convenient features to electronic devices. In another usage example, a camera such as a video camera connected to a computer for video chat could be muted when the user steps out of view of the camera. Similarly, a microphone connected to a computer could be muted when the user turns away to talk to someone else in the room, answers their phone, etc. Face sensing and identification can also be used to permit access to an electronic device such as a computer, tablet, or phone; access to a room or building; and so on. The face sensing and identification could also be used to track movement of individuals within a room, between rooms, etc.

Sensing techniques that enable sensing of faces are disclosed. The sensing of faces can include detecting faces, recognizing faces, learning faces, and so on. An image that can contain one or more faces can be captured using a low-resolution camera. The camera can capture images in black and white or grayscale, color, and so on. Depending on an application for sensing faces, the camera can capture images based on other wavelengths of light such as infrared images. Neural networks that can operate on a processor such as a microcontroller can detect faces in images and can recognize faces that have been detected previously. The recognizing can be based on a face ID. Face IDs associated with faces that have not been detected previously can be saved for future reference. Thus, new faces can be learned, and detection of previously saved faces can be improved as the previously saved faces are detected on further images.

The sensing faces is enabled by a low-resolution embedded face identification sensor with machine learning. Faces captured in images can be detected by a neural network. The neural network can execute a machine learning model that has been trained to detect faces. Faces can be recognized based on a face ID. The recognition of the faces can be accomplished by a second neural network. The second neural network can execute a machine learning model that has been trained to determine whether a detected face matches a face ID that was previously saved. If a detected face does not match a face ID, then a new face ID can be generated for the new face. Thus, the face identification sensor can learn new faces. The detecting and recognizing faces can be accomplished when a detected face is looking in the direction of the low-resolution camera. When the detected face is looking to the side of the camera, or above or below the camera, the face identification sensor will attempt to recognize the face. If the face under rotation horizontally, vertically, or both horizontally and vertically can be recognized, the face identification sensor can successfully recognize the face based on one or more confidence scores. A first confidence score can be higher when the face is looking in the direction of the camera or lower when looking away from the camera. The first confidence score can indicate that a face was detected. A second confidence score can be used to determine whether a face was recognized. A second confidence score that is higher can indicate successful face recognition, while a lower second confidence score can indicate uncertainty of recognition or that the face was unrecognized. Because the machine learning models of the disclosed concepts can be implemented as "light-weight" models, the models can be run on the "edge" using very small/cheap computers. This contrasts with the typical approach to machine learning that uses large GPUs to run models.

FIG. 1 is a flow diagram for a low-resolution embedded face identification sensor with machine learning. A face identification sensor is used to capture one or more images which can include one or more faces. The face identification sensor includes a low-resolution camera that is used to capture the images. The face identification sensor also includes a microcontroller. The microcontroller can execute neural networks, where the neural networks can be used to detect and recognize faces in the captured images. The face identification sensor can be used to authorize access, control appliances and electronic devices, and so on. The face identification sensor can learn new faces and can improve recognition of previously detected ones.

The flow 100 includes capturing one or more images 110 by a face identification sensor. The one or more images can include one or more faces of individuals who can be in the vicinity of the face identification sensor. A face being in the vicinity of the face identification sensor can include a face that is a few centimeters from the sensor, a few hundred centimeters from the sensor, a meter from the sensor, and so on. The face identification sensor can operate at a fixed distance from a face or a variable distance from a face. The face identification sensor includes a low-resolution camera. The low-resolution camera can include a monochrome or grayscale camera, a color (e.g., RGB) camera, and so on. The low-resolution camera can include a still camera, a video camera, etc. The images that are captured by the low-resolution camera can include a number of pixels. The pixels can include four-bit pixels, eight-bit pixels, and so on. In embodiments, the low-resolution camera can capture images comprising 340×220 pixels. Other numbers of pixels can be associated with the images. The flow 100 includes resizing 112 the one or more images into a square grid. The resizing can isolate faces from a background, reduce storage requirements, etc. The face identification sensor further includes a microcontroller and an external memory. The microcontroller can include an ultra-low-power architecture. The microcontroller architecture can execute networks such as neural networks. The neural network can be used to execute models such as machine learning models. In embodiments, at least two machine learning models can operate simultaneously on the microcontroller.

The flow 100 includes detecting one or more faces 120 in the image that was captured. The faces can be clustered, located at different positions within the image, located at different distances from the low-resolution camera, and so on. A variety of techniques can be used for detecting faces. In embodiments, the detecting is accomplished by a first neural network operating on the microcontroller. The first neural network can include one or more of input layers, hidden layers, output layers, and the like. Each layer can include one or more nodes or "neurons". Each node can accept an input, apply a weight or a bias, generate an output, etc. In the flow 100, the detecting includes a first confidence score 122 associated with each face in the one or more faces. In embodiments, the detecting further includes creating, for each face of the one or more faces, a bounding box. The bounding box can isolate a face from other faces, from objects in the image that are adjacent to the face, and the like. The bounding box can include a square, rectangle, circle, oval, etc. The bounding box can reduce the amount of data processed by the first neural network. In embodiments, the first confidence score represents a confidence that the bounding box bounds a face. A high confidence score can indicate that the bounding box bounds the face. A low confidence score can indicate that the face is not entirely bound, that other objects may be included in the bounding box, etc. In embodiments, the size of the bounding box can correlate to a distance to the face identification sensor. A small bounding box can indicate that a face is farther from the face identification sensor, and a large bounding box can indicate that a face is closer to the face identification sensor.

The flow 100 includes recognizing 130, by a second neural network operating on the microcontroller, the one or more faces. The recognizing can include recognizing that a face is present, recognizing a face that has been detected previously, and so on. In the flow 100, the recognizing is based on a face ID 132. A face ID can include a number, a code, text such as a name, and so on. The face ID can be generated by a machine learning model such as the second machine learning model. The recognizing can be based on a confidence score (discussed below). In the flow 100, the recognizing further includes creating, by the second neural network, a plurality of embeddings 160 for each face of the one or more faces, wherein the embeddings represent facial features of each face, and wherein the plurality of embeddings comprises a vector of scalar values. Embeddings can be used to transform a high-dimensional space into a low-dimensional space. Discrete points from the high-dimensional space can be mapped into the vector to simplify computation. The facial features can include facial regions, facial landmarks, identifying marks such as moles or scars, and so on. In embodiments the facial landmark locations can include a nose, a left side of a mouth, a right side of a mouth, a left eye, a right eye, and so on. Facial landmarks can include glasses, facial hair, facial coverings, and the like that can be routinely worn by an individual.

Many types of machine learning models (ML) exist that can be used for detecting faces, recognizing faces, and so on. The choice of ML model can be based on a variety of criteria such as accuracy requirements; processor resource capabilities such as processor speed and memory, size, and power consumption; and so on. The ML models can be based on techniques such as regression, classification, and so on. ML regression models can be applied to data where the response of the model can be continuous. A regression ML model can be used to predict an outcome based on the data, such as predicting a texture or a composition. Regression can fit a curve to data such as the training data, then can use the curve to make predictions about new data such as production data. ML regression models can be based on linear regression, nonlinear regression, Gaussian progress regression (GPR), and/or support vector machines (SVMs). ML regression models can be based on shallow or deep neural networks. In embodiments, the machine learning model can include a convolutional neural network (CNN). ML classification models can be applied to data where the model response can include a set of classes. A result can indicate that data is a member of a class or not a member of a class. A class can include a face, an object (e.g., not a face), and so on. ML classification models can include a decision tree, a k-nearest neighbor (KNN), an SVM, a shallow or deep neural network, a naive Bayes classifier, etc. As for an ML regression model, a neural network for an ML classification model can include a convolutional neural network (CNN).

In embodiments, one or more machine learning models can be trained. The training can be based on supervised learning in which a training dataset comprising data and labels associated with the data is used to adjust weights and biases associated with the machine learning model. The adjusting weights increases model accuracy, convergence speed, and the like. The training can also include semi-supervised learning in which the labeled data can be used with unlabeled data. The training can further include unsupervised training, where the model tries to identify clusters in the data, trends, etc. The training can include data from faces that are encountered during the operation of the sensor. The machine learning model can be based on a convolutional neural network. The convolutional neural network can be trained. Further embodiments include training the convolutional neural network with training data representing a plurality of faces. Training the convolutional neural network can be accomplished with data from faces that are encountered during the operation of the sensor. The training data can include data and labels associated with a variety of face types; skin tones; eye shapes; nose, mouth, and ear sizes; facial coverings; facial hair; etc. In embodiments, a microcontroller hosts a convolutional neural network. The microcontroller can include an inexpensive microcontroller based on an 8-bit, 16-bit, or other precision architecture. In embodiments, the convolutional neural network can operate on a microcontroller. The trained machine learning model can be loaded into the microcontroller. The model can be stored in memory such as non-volatile memory.

The flow 100 includes clustering embeddings 162 within the plurality of embeddings that were created for each face of the one or more faces. Embeddings associated with a first face tend to form one cluster, while embeddings associated with a second face tend to form a second cluster. The clusters form because the different embeddings are associated with each of the facial landmarks of a face. Further, a face does not appear exactly the same across the one or more images. The flow 100 includes calculating, for each face of the one or more faces, a center 164 of the embeddings that were clustered. Calculating the center of the embeddings can be accomplished using a variety of techniques. In embodiments, the calculating the center of the points can include calculating a centroid for the cluster of points. The flow 100 further includes assigning, to each face of the one or more faces, the face ID and the second confidence score 166. The face ID and the second confidence score are based on a cosine of an angle between geographic centers of the embeddings. The face ID can include a tag, a code, a value, and so on. The face ID can be one of a number of face IDs. In embodiments, the face ID is limited to one of eight values. The eight face ID values can represent eight different faces. The flow 100 includes matching the face ID 168 with one or more values stored in the external memory. The values stored in the external memory can include face IDs that were previously generated based on captured images. A match of the face ID to one or more values in the external memory can be used to recognize the face based on the face ID.

The flow 100 includes assigning a second confidence score 140 to each of the one or more faces that were recognized. The second confidence score can include a value, a percentage, a probability, and so on. In embodiments, the second confidence score can represent a confidence that each of the one or more faces was recognized. In a usage example, a high confidence score can indicate that a face was likely recognized, a medium confidence score can indicate that a face may have been recognized, and a low confidence score can indicate that the face was not recognized. The flow 100 includes saving, to the external memory, the face ID 150. The external memory can include a memory external to the microcontroller. The external memory can include a removable memory such as a memory card. In embodiments, the external memory can include nonvolatile memory. The nonvolatile memory can include flash memory, resistive RAM (ReRAM), and so on. In the flow 100, the saving the face ID is based on the second confidence score 152. In embodiments, the saving is executed when the second confidence score that was assigned is below a threshold. That is, when the second confidence score includes a value indicative of low confidence or perhaps moderate confidence, the face ID can be saved.

The flow 100 further includes calibrating the face identification sensor 170, wherein the calibrating stores a new face. The storing a new face can be an initial face, an additional face, and so on. In embodiments, the calibration can be triggered by a system API call. In a usage example, an individual intends to use the face identification sensor to access their computer. The individual would capture one or more images and let the face identification assign a face ID to their face. The face ID can be stored in the external memory. In the flow 100, the calibrating further includes collecting 172 a series of images over time of a new face, wherein the collecting includes embeddings for each image of the series of images. The collecting images can include the user configuring their face identification system, a new user, and so on. The amount of time over which the images are collected can include milliseconds, seconds, minutes, hours, days, weeks, and so on. As more images are collected and are processed, the calibrating of the face identification system can be improved. The flow 100 includes clustering the embeddings 174 for each image of the series of images. Discussed previously, the embeddings can be based on facial landmark locations such as the nose, eyes, mouth, ears, etc. The flow 100 further includes determining the average 176 of the clustering. The average can be based on an average of embeddings in each cluster, an average of the centers of the embeddings, etc. The average can comprise an arithmetic average, a mean, a mode, and so on.

Various steps in the flow 100 may be changed in order, repeated, omitted, or the like without departing from the disclosed concepts. Various embodiments of the flow 100 can be included in a computer program product embodied in a non-transitory computer readable medium that includes code executable by one or more processors. Various embodiments of the flow 100, or portions thereof, can be included on a semiconductor chip and implemented in special purpose logic, programmable logic, and so on.

Figure 2:
FIG. 2 is a flow diagram for detecting faces.
Figure 2:
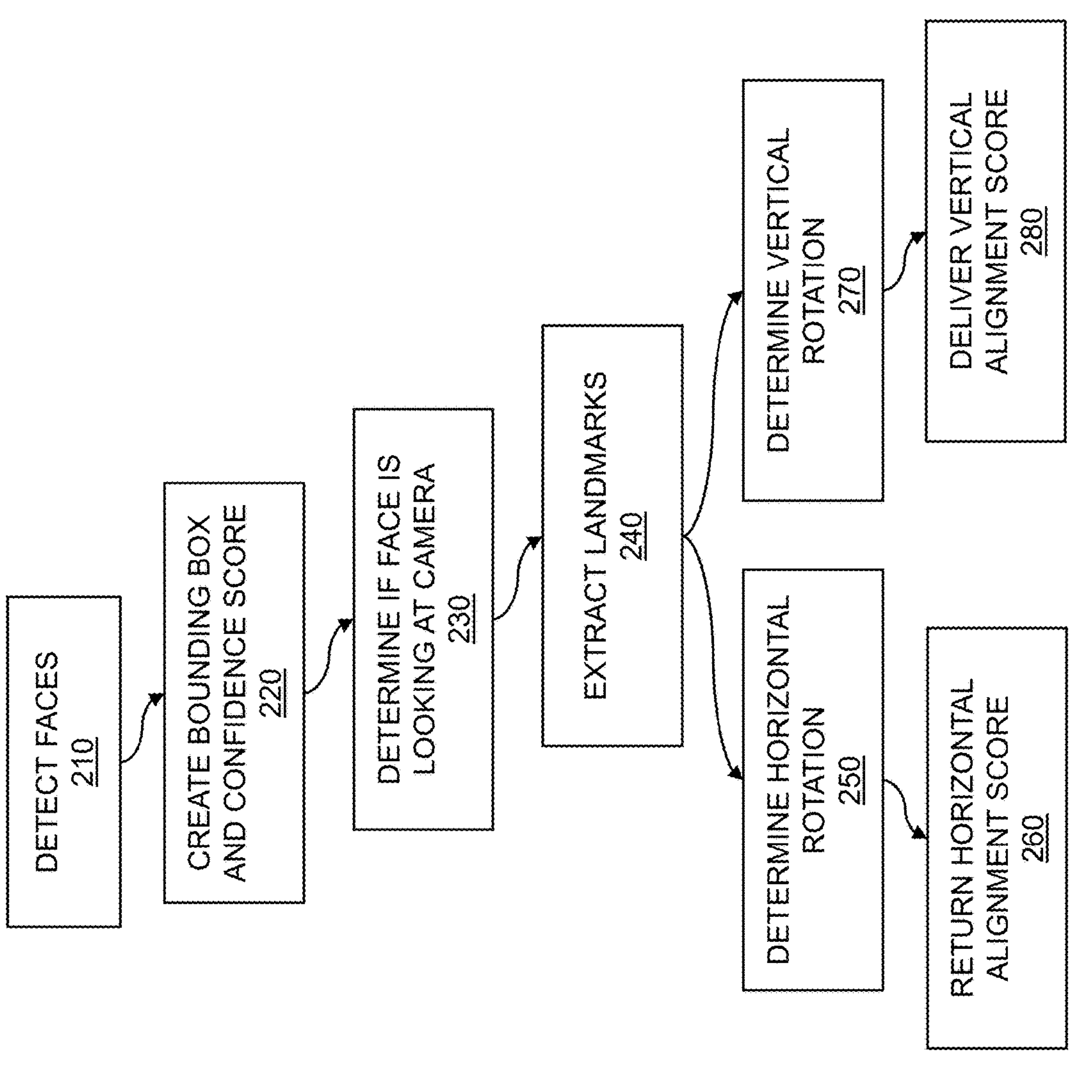

FIG. 2 is a flow diagram for detecting faces. The detecting faces is accomplished using a low-resolution embedded face identification sensor with machine learning. Discussed above and throughout, a low-resolution camera can be used to capture one or more images. The low-resolution camera can include a monochrome or grayscale camera, a color camera, and so on. The low-resolution camera can include a still camera, a video camera, etc. One or more faces can be detected within captured images using a first neural network. The neural network can be operating on a microcontroller associated with the face identification sensor. The neural network can be configured to execute operations associated with a machine learning model, where the machine learning model can be trained to detect faces, if any, in a captured image. The detecting can further include creating a bounding box around each face in a captured image. The detecting can include a first confidence score, where the first confidence score can represent a confidence that the bounding box bounds a face. The one or more detected faces can be recognized by a second neural network operating on the microcontroller. The recognizing the faces can be based on a face identification (ID). The face ID can be saved in an external memory for comparison with one or more faces detected in the captured images. A second confidence score is assigned to each recognized face in an image. The second confidence score can represent a confidence that each of the one or more faces was recognized. The face ID can be saved to an external memory. The saving can occur when the second confidence score that was assigned is below a threshold. A confidence score below the threshold can indicate that a face was not recognized. An unrecognized face can be saved to the external memory for future recognition.

The face identification can be accomplished using an apparatus for sensing faces. The apparatus can include a low-resolution camera located on a printed circuit board. The low-resolution camera can be mounted to collect images of faces in a vicinity of the printed circuit board. The vicinity of the printed circuit board can include a distance of a few centimeters such as 10 centimeters, 100 centimeters, a meter, and so on. The apparatus can include a microcontroller. The microcontroller can be mounted to the printed circuit board and can be coupled to the low-resolution camera. The microcontroller can host at least two convolutional neural networks simultaneously. The apparatus can include an external memory such as a non-volatile memory that can be coupled to the microcontroller. The external memory can be mounted to the printed circuit board. The apparatus can include a power source, where the power source can be contained within, on, or next to the printed circuit board. The power source can be connected to provide power to the printed circuit board and elements associated with the printed circuit board.

The flow 200 includes detecting 210 one or more faces in an image that was captured. The detecting can be based on identifying one or more features such as facial features within the image. The facial features can include a nose, a left eye, a right eye, corners of a mouth, and so on. The facial features can further include eyebrows, bridge of the nose, ears, etc. The detecting can be accomplished using a first neural network operating on a microcontroller. The microcontroller can include an ultra-low-power microcontroller. The microcontroller can be based on an architecture that can be configured to efficiently execute models such as machine learning models. The flow 200 includes creating, for each face of the one or more detected faces, a bounding box 220. The bounding box can include various geometric shapes such as a square, rectangle, circle, oval, triangle, etc. The bounding box can be created by detecting image features within the image. The image features can include an edge such as an edge of a face. The image features can further include the facial features just described. A confidence score such as a second confidence score can be assigned to each detected face. In embodiments, the second confidence score can represent a confidence that each of the one or more faces was recognized. A high confidence score can be associated with recognition, while a moderate or low confidence score can be associated with uncertainty or ambiguity, or an unrecognized face, respectively.

The flow 200 includes determining 230 if each face of the one or more faces is looking at the low-resolution camera. A detected face can be looking at the low-resolution camera, looking in a direction other than at the camera, interacting with other individuals whose faces can be detected in the image, and so on. The determining the direction of a face such as a gaze direction can be based on extracting facial features from the image. Facial features can include facial regions, facial landmarks, and so on. The flow 200 includes extracting landmark locations 240 from each face of the one or more faces. The landmarks can include physical attributes of a face. In embodiments, the landmark locations can include a nose, a left side of a mouth, a right side of a mouth, a left eye, or a right eye of each face. Physical attributes can also include the bridge of the nose, chin, ears, and the like. Other attributes, such as glasses, facial coverings, facial hair, etc. can also be extracted.

Discussed above, an individual whose face can be detected within a captured image can be facing toward the low-resolution camera or can be looking away from the camera. That is, the individual's face can be rotated with respect to the camera. The flow 200 includes determining a horizontal rotation 250 of each face, wherein the horizontal rotation is based on a ratio of a distance between the nose, and a left or a right side of the mouth. In a usage example, an individual has rotated their head to the left by a number of degrees. Distances between facial landmarks, for the facial landmarks that remain visible, can change. The distance between the right side of the individual's mouth and their right eye can appear shorter than the distance would appear if the individual were facing the camera. The flow 200 further includes returning, for each face of the one or more faces, a horizontal alignment score 260, wherein the horizontal alignment score represents a probability that each face is horizontally aligned with the face identification sensor. As the individual rotates their head to the left or to the right, the alignment score can decrease because the individual is less aligned with the camera than when facing the camera.

In addition to horizontal rotation, the individual can rotate their face vertically, both horizontally and vertically, diagonally, and so on. The flow 200 includes determining a vertical rotation 270 of each face, wherein the vertical rotation is based on a ratio of a distance between the nose, and a left eye or a right eye. As for horizontal rotation, distances between facial landmarks associated with an individual's face that is rotated vertically can appear to change. The change can include a reduction in the distance between landmarks. The flow 200 further includes delivering, for each face of the one or more faces, a vertical alignment score 280, wherein the vertical alignment score represents the probability that each face is vertically aligned with the face identification sensor. A vertical alignment score can be highest when a person is facing the camera and can be reduced when the person rotates their head up or down from facing the camera. Recall that the rotation of the individual's face can include a combination of a vertical rotation and a horizontal rotation. Thus, the vertical alignment score and the horizontal rotation score can both change.

Various steps in the flow 200 may be changed in order, repeated, omitted, or the like without departing from the disclosed concepts. Various embodiments of the flow 200 can be included in a computer program product embodied in a non-transitory computer readable medium that includes code executable by one or more processors. Various embodiments of the flow 200, or portions thereof, can be included on a semiconductor chip and implemented in special purpose logic, programmable logic, and so on.

Figure 3:
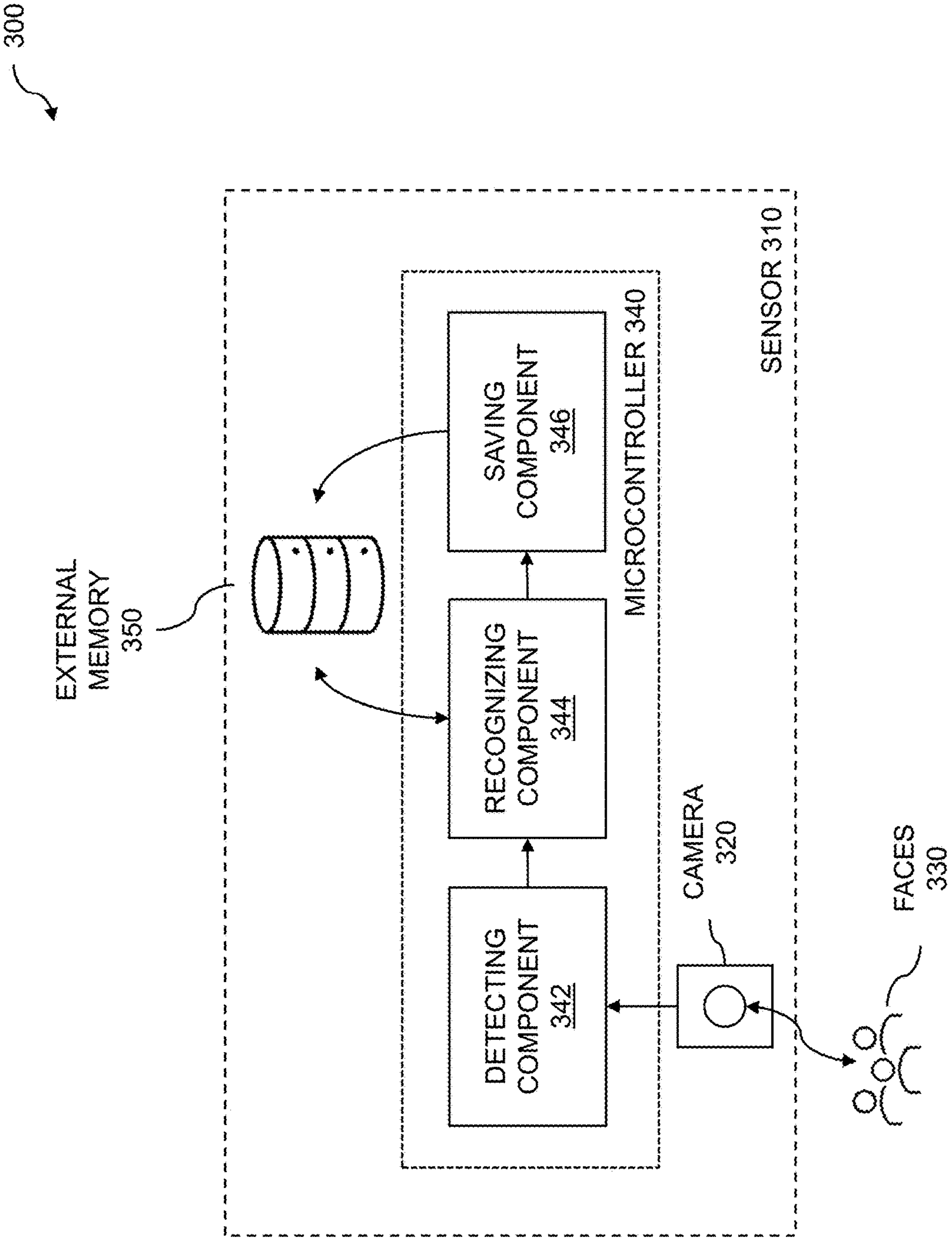
FIG. 3 is a system block diagram of a low-resolution embedded face sensor with machine learning.

FIG. 3 is a system block diagram of a low-resolution embedded face sensor with machine learning. Described previously, a face identification sensor can be used to detect faces in a captured image and to recognize faces based on a face ID. The sensing and recognition of faces can be used for applications such as authentication, verification, confirmation, and the like. Image capture can be accomplished using a low-resolution camera. The recognition can be accomplished using machine learning models, where the machine learning models can be executed on a computing device such as a microcontroller. Sensing faces is accomplished using a low-resolution embedded face identification sensor with machine learning. One or more images are captured by a face identification sensor, wherein the face identification sensor includes a low-resolution camera, wherein the face identification sensor includes a microcontroller and an external memory, and wherein at least two machine learning models operate simultaneously on the microcontroller. A first neural network operating on the microcontroller detects one or more faces in the image that was captured, wherein the detecting includes a first confidence score associated with each face in the one or more faces. A second neural network operating on the microcontroller recognizes the one or more faces, wherein the recognizing is based on a face ID. A second confidence score is assigned to each of the one or more faces that were recognized. The face ID is saved to the external memory, wherein the second confidence score that was assigned is below a threshold.

The block diagram 300 can include a sensor 310. The sensor can include a face identification sensor. The sensor can capture images, detect faces in images, recognize faces, and so on. The face identification sensor can include a camera 320. In embodiments, the camera includes a low-resolution camera. The low-resolution camera can include a black and white camera, a grayscale camera, a color camera such as a red-green-blue (RGB) camera, and so on. The camera can include a still camera, a video camera, and the like. In embodiments, the low-resolution camera can capture images comprising 340×220 pixels. The pixels can have a bit depth of four bits, eight bits, etc. Other numbers of pixels can be associated with the captured images. The camera can be placed on a circuit board associated with the face identification sensor. The camera can be used to capture one or more images where the images can include one or more faces associated with individuals 330. The individuals can be grouped in the images, observed individually in the image, etc. The faces within the image can be looking at the camera, looking to a side of the camera, and so on. When an individual is looking to a side of the camera, the individual's face can be rotated. The rotation can include horizontal rotation, vertical rotation, and a combination of horizontal and vertical rotation.

The block diagram 300 can include a microcontroller 340. The microcontroller can include architecture based on eight bits, sixteen bits, and so on. The microcontroller can be based on an ultra-low-power architecture, where the microcontroller can operate in a power-efficient manner. Power-efficient operation of the microcontroller can be accomplished using a plurality of operating power modes such as standby mode, low or reduced power mode, maximum performance mode, etc. The microcontroller can be based on an architecture that can be optimized for executing machine learning applications based on machine learning models. The microcontroller can include a detecting component 342. The detecting component can detect, by a first neural network operating on the microcontroller, one or more faces in the image that was captured. The detecting can include a first confidence score associated with each face in the one or more faces. The first neural network can be configured to execute a machine learning model, where the machine learning model has been trained to detect faces in the captured images. In a usage example, a high confidence score can indicate a high likelihood that a face has been detected. A low confidence score can indicate that a face may or may not have been detected in the image.

The microcontroller can include a recognizing component 344. The recognizing component can recognize, by a second neural network operating on the microcontroller, the one or more faces. The recognizing can be based on a face ID. The recognizing can include comparing the detected face to a face that was detected previously. In embodiments, the microcontroller can include an assigning component (not shown). The assigning component can assign a second confidence score to each of the one or more faces that were recognized. The second confidence score can be associated with a degree of confidence or probability that the face was correctly recognized by the second neural network. The microcontroller can include a saving component 346. The saving component can save the face ID, wherein the second confidence score that was assigned is below a threshold. A second confidence score below a threshold can indicate that a new or previously unrecognized face has been detected. The new face can include a new user who can be authorized to use the face recognition system. The new face can include an unauthorized user.

The block diagram 300 can include an external memory 350. The external memory can include a memory adjacent to the microcontroller, accessible by the microcontroller, and so on. The external memory can include a memory coupled to the printed circuit board associated with the face identification sensor. The external memory can include a removable memory, a remote memory, and the like. The memory can include a nonvolatile memory. The nonvolatile memory can include a flash memory, a resistive memory (ReRAM), and the like. The external memory can be accessed by one or more components associated with the microcontroller. In embodiments, the external memory can be accessible to the recognizing the component and the saving component. The recognizing component can access the external memory when detecting one or more faces in one or more captured images. The saving component can save face IDs to the external memory.

Figure 4:
FIG. 4 illustrates an example neural network.
Figure 4:
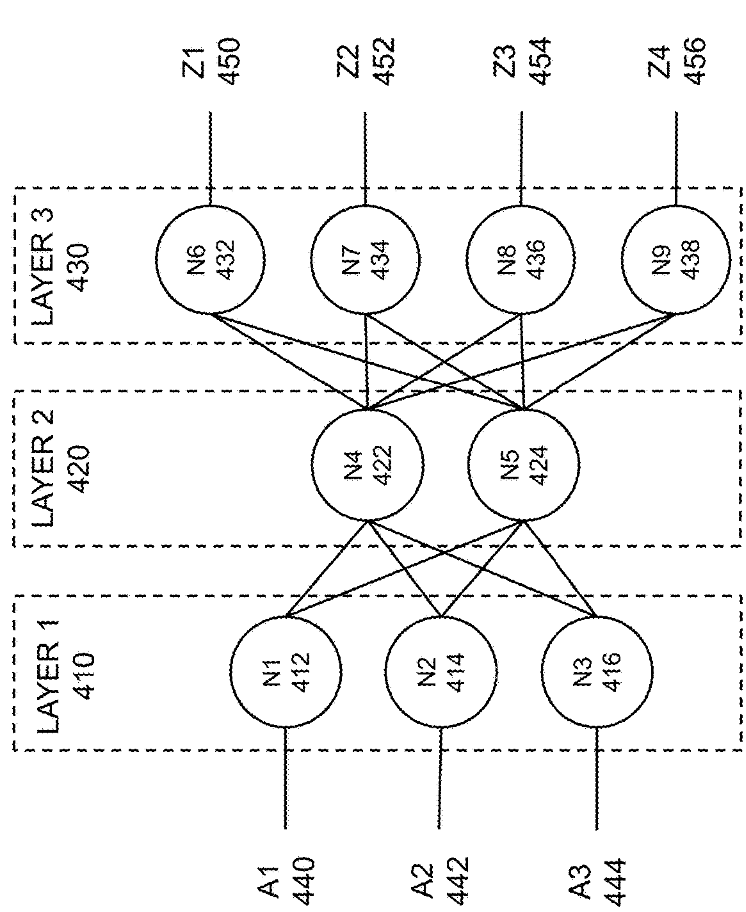

FIG. 4 illustrates an example neural network. The neural network can be used to accomplish a variety of computational tasks. The network can be configured to accomplish audio and speech processing, natural language processing, text processing, image processing, and so on. The neural network can also be configured for machine learning. The neural network, such as a neural network for machine learning, can be based on various types of neural networks such as a convolutional neural network (CNN). The neural network can further include a deep neural network (DNN), a recurrent neural network (RNN), etc. The neural network comprises a plurality of layers. The neural network layers can include one or more of an input layer, an output layer, an activation layer, a bottleneck layer, a convolutional layer, and so on. The activation layer can include a nonlinear function that helps prevent the neural network from getting stuck on its maximum numeric value or its smallest numeric value. The bottleneck layer, if present, can be used for neural network training. A trained neural network can be used to detect one or more faces in a captured image, to recognize the one or more faces in the image, and the like. One or more neural networks enable a low-resolution embedded face identification sensor with machine learning. One or more images are captured by a face identification sensor, wherein the face identification sensor includes a low-resolution camera, wherein the face identification sensor includes a microcontroller and an external memory, and wherein at least two machine learning models operate simultaneously on the microcontroller. A first neural network operating on the microcontroller detects one or more faces in the image that was captured, wherein the detecting includes a first confidence score associated with each face in the one or more faces. A second neural network operating on the microcontroller can recognize the one or more faces, wherein the recognizing is based on a face ID. A second confidence score is assigned to each of the one or more faces that were recognized. The face ID is saved to the external memory, wherein the second confidence score that was assigned is below a threshold.

The FIG. 400 shows a neural network. The neural network can be configured for machine learning. The neural network includes one or more layers. The layers can include input layers such as input layer 1 410; intermediate or hidden layers such as layer 2 420; output layers such as layer 3 430; and so on. A neural network with one or a few hidden layers can include a shallow network, while a neural network with several hidden layers can include a deep network. Each layer of the neural network can include one or more nodes. Each node can include an input, a weight (not shown), a bias, etc. Layer 1 can include three nodes, node N1 412, node N2 414, and node N3 416. The inputs A to layer 1 can include input A1 440 to node N1; input A2 442 to node N2; and input A3 444 to node N3. A weight can be associated with each node of layer 1. The outputs of the nodes in layer 1 can be connected to one or more inputs of the nodes in layer 2. Layer 2 can include two nodes, node N4 422 and node N5 424. When each output of a node in a prior layer such as layer 1 is connected to input of a layer, the network layer is defined to be fully connected. A weight can be associated with each node of layer 2. The outputs of the nodes in layer 2 can be connected to one or more inputs of nodes in layer 3. Layer 3 can include four nodes, node N6 432; node N7 434; node N8 436; and node N9 438. A weight can be associated with each node of layer 3. In the figure, an output Z can be generated by layer 3. The outputs can include output Z1 450 from node N6; output Z2 452 from node N7; output Z3 454 from node N8; and output Z4 456 from node N9.

In the example neural network 400, the output of each of the nodes associated with a layer is coupled to each input of the nodes associated with a subsequent layer. The coupling of each node output of a layer to each node input of a subsequent layer comprises a fully connected (FC) layer of the neural network. While the example neural network shown includes only one hidden layer, a neural network can include other numbers of hidden layers. The hidden layers can include substantially similar layers or substantially dissimilar layers, numbers of node per layer, weights, biases, etc. The hidden layers can be fully connected layers as just described. The hidden layers can include other types of layers such as convolutional layers, where a subset of outputs is connected to a subset of inputs. The hidden layers can further include one or more of bottleneck layers, activation layers, etc.

Figure 5:
FIG. 5 shows the creating of bounding boxes.
Figure 5:
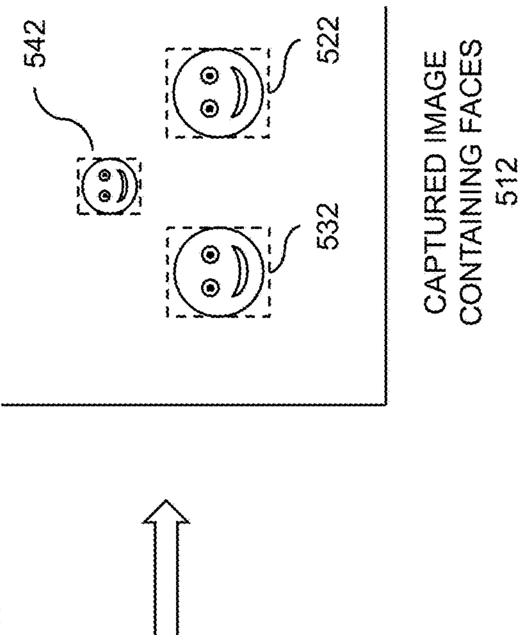

FIG. 5 shows the creating of bounding boxes. A bounding box can be created for faces that can be detected in one or more images captured by a low-resolution camera associated with a face identification sensor. The bounding boxes can be used to extract a face from an image, to separate faces from each other, and so on. The bounding box can be used to limit the amount of data that can be processed by a neural network operating on a microcontroller. By limiting the amount of data to be processed, the neural network can process the image data more efficiently. More efficient processing allows the neural network to operate on a low-cost, low-power embedded controller, enabling the sensor's use in many cost-sensitive applications. The creating of bounding boxes supports a low-resolution embedded face identification sensor with machine learning. One or more images are captured by a face identification sensor, wherein the face identification sensor includes a low-resolution camera, wherein the face identification sensor includes a microcontroller and an external memory, and wherein at least two machine learning models operate simultaneously on the microcontroller. A first neural network operating on the microcontroller detects one or more faces in the image that was captured, wherein the detecting includes a first confidence score associated with each face in the one or more faces. A second neural network operating on the microcontroller recognizes the one or more faces, wherein the recognizing is based on a face ID. A second confidence score is assigned to each of the one or more faces that were recognized. The face ID is saved to an external memory, wherein the second confidence score that was assigned is below a threshold.

Bounding boxes can be created for images in which faces are detected 500. A camera such as a low-resolution camera 510 can be used to capture one or more images. The captured image can include an image containing one or more individuals such as individuals 520, 530, and 540. While three individuals are shown, other numbers of individuals can be included in the image. Further, the image can include one or more of animals, objects, plants, environmental elements, and so on. An example image captured by the low-resolution camera associated with the face sensor is shown 512. The image can contain the three individuals captured in the image the camera. The individuals in the image can be positioned as they were in the space in which the image was captured. Further, the sizes of the individuals in the image can vary based on the relative positions of the individuals within the space. A first neural network operating on a microcontroller associated with the face sensor can be used to detect one or more faces. In embodiments, the detecting can further include creating, for each face of the one or more faces, a bounding box, wherein a first confidence score can represent a confidence that the bounding box bounds a face. In the figure, bounding box 522 defines a boundary for the face of individual 520; bound box 532 defines a boundary for the face of individual 530; and bounding box 542 defines a boundary for the face of individual 540. A high confidence source can indicate that that the bounding box surrounds a face rather than an animal, object, etc. The bounding box can be used to isolate one or more faces detected within the image. The isolating of the faces can reduce the amount of data that can be processed by the neural network in order to accomplish recognition of a face. Recall that the individuals within a captured image can be positioned at different distances from the camera. In embodiments, a size of the bounding box can correlate to a distance to the face identification sensor. A smaller bounding box can indicate that an individual was positioned farther from the camera, and a larger bounding box can indicate that that an individual was positioned closer to the camera.

Figure 6:
FIG. 6 illustrates clustering of embeddings.
Figure 6:
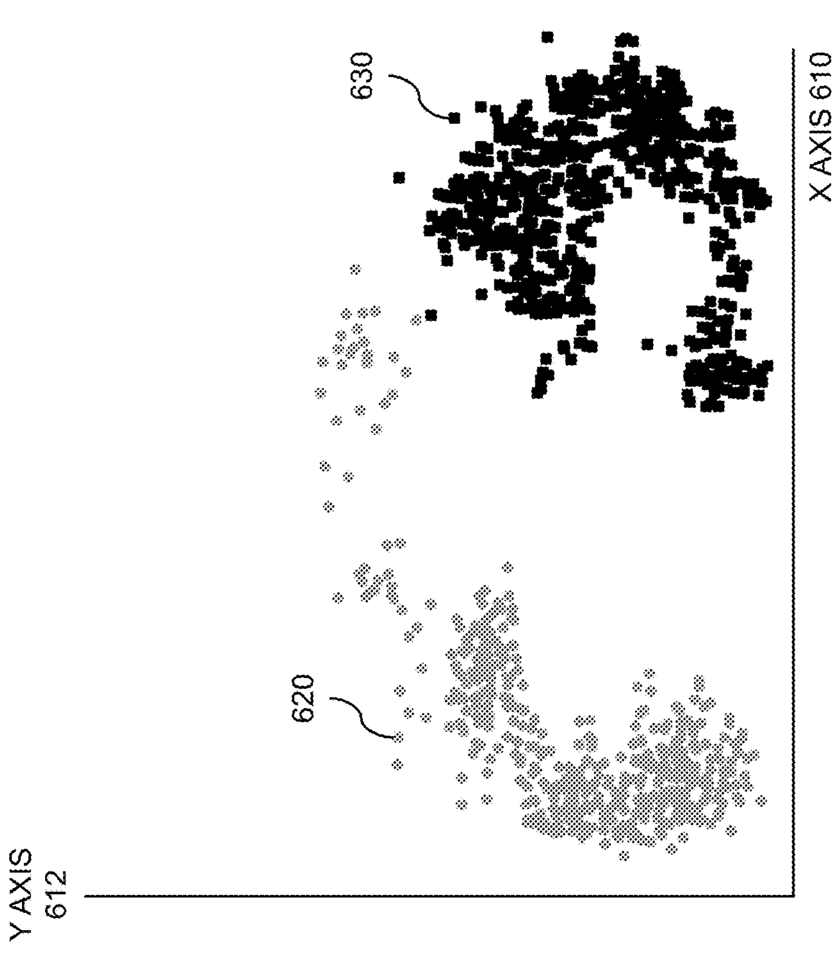

FIG. 6 illustrates clustering of embeddings. Embeddings can include techniques for face identification. An embedding contains coordinates in a high-dimensional space. The embeddings can include a vector, where the vector can be generated by a machine learning model. Embeddings associated with a face can be clustered in the high dimensional space. A design objective for the machine learning model can include designing the model such that clusters of embeddings for different faces are separated as much as possible in the high dimensional space. The separating or "pushing away" of the clusters can be accomplished based on a distance metric. Embeddings enable a low-resolution embedded face identification sensor with machine learning.

An example clustering of multiple embeddings is shown 600. Embeddings can be obtained from facial features associated with faces detected in one or more images captured by a low-resolution camera. The embeddings can be plotted in a low dimensional space such as a two-dimensional space as a method of visualizing the high dimensional space. An example of embeddings can be based on an x axis 610 and a y axis 612. The plotted embeddings can form one or more clusters such as cluster 620 and cluster 630. The clusters can be associated with embeddings obtained from facial features associated with different faces. Cluster 620 can be associated with a first face, while cluster 630 can be associated with a second face. The clusters of embeddings can be created based on recognizing faces. In embodiments, the recognizing can further include creating, by the second neural network, a plurality of embeddings for each face of the one or more faces. The embeddings represent facial features of each face. The facial features of each face can include eyes, a nose, a mouth, ears, and so on. In embodiments, the plurality of embeddings comprises a vector of scalar values. An embedding can include a mapping of a discrete variable to a vector, where the vector can comprise continuous values. The clustering can be based on finding nearest neighbors within an embedding space such as the high dimensional space described. Embodiments can include calculating a center of the embeddings that were clustered based on each face. The calculating the center of the embeddings can include calculating a geographic center of the embeddings.

Figure 7:
FIG. 7 shows an example determining horizontal rotation.
Figure 7:
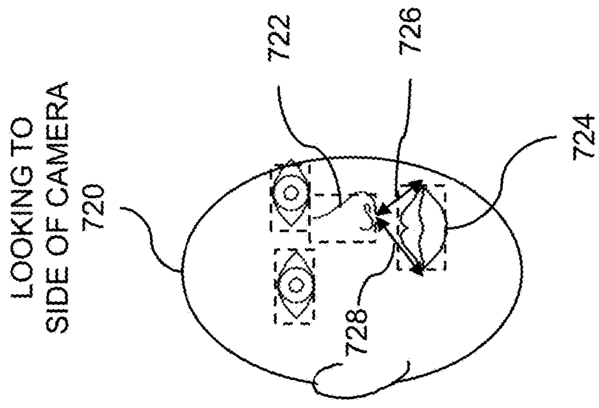
Figure 7:
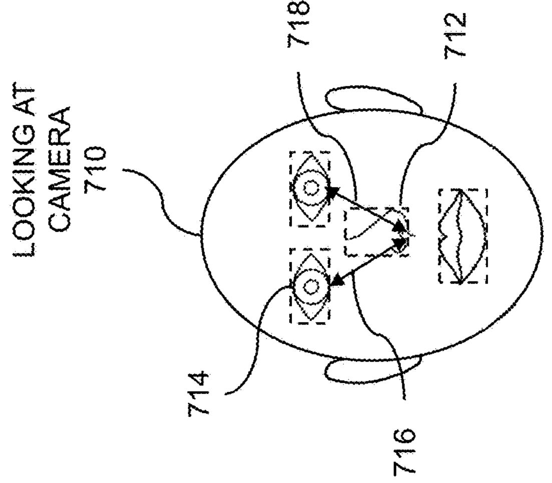

FIG. 7 shows an example determining horizontal rotation. Discussed previously and throughout, a face identification sensor can be used to capture images that can contain one or more faces. The one or more faces that can be captured can be directly facing a camera, such as a low-resolution camera, or the face can be rotated. The rotation of the face can occur when a person is looking in a direction other than directly at the camera. As the face rotates from full on, to ¾ profile, to profile, etc., distances between regions and landmarks associated with the face can change. Further rotation of the face can cause regions and landmarks to be lost from view of the camera. An amount of rotation, such as horizontal rotation, of the face can be determined based on changing ratios of distances between facial landmarks. Determining horizontal rotation supports a low-resolution embedded face identification sensor with machine learning. One or more images are captured by a face identification sensor, wherein the face identification sensor includes a low-resolution camera, wherein the face identification sensor includes a microcontroller and an external memory, and wherein at least two machine learning models operate simultaneously on the microcontroller. A first neural network operating on the microcontroller detects one or more faces in the image that was captured, wherein the detecting includes a first confidence score associated with each face in the one or more faces. A second neural network operating on the microcontroller recognizes the one or more faces, wherein the recognizing is based on a face ID. A second confidence score is assigned to each of the one or more faces that were recognized. The face ID is saved to the external memory, wherein the second confidence score that was assigned is below a threshold.

The example 700 illustrates faces that can be detected in one or more images captured by a low-resolution camera. The low-resolution camera can be associated with a face identification sensor. A face can be looking at the camera, can be looking to either side of the camera, and so on. Embodiments can include determining if each face of the one or more faces in a captured image is looking at the low-resolution camera. An example of a face looking at the camera is shown 710. To determine whether a face is looking at the camera, facial landmarks can be extracted from the face. Embodiments can include extracting landmark locations from each face of the one or more faces, wherein the landmark locations include a nose 712, a left side of a mouth, a right side of a mouth, a left eye, or a right eye 714 of each face. The landmarks can further include left and right edges of eyes, eyebrows, ears, bridge of a nose, etc. The choice of which landmarks to include can be based on processing power of the microcontroller, resolution of the low-resolution camera, etc. Distances between and among facial landmarks can be determined. The distances between landmarks can include a distance between the nose and the right eye 716, the distance between the nose and the left eye 718, and the like.

The facial landmarks can be used to determine horizontal rotation of each face. An example of a face that is horizontally rotated to look to the side of the camera is shown 720. The horizontal rotation can include a number of degrees, radians, and so on. The horizontal rotation of the face can be based on facial landmarks such as the eyes, the nose 722, the mouth 724, the ears, etc. Embodiments include determining a horizontal rotation of each face, wherein the horizontal rotation is based on a ratio of a distance between the nose, and a left 726 or a right 728 side of the mouth. The distances between the nose and the left or right sides of the mouth, if visible in the captured image, will appear to change under rotation of the face. The determining the amount of rotation of the face can be based on a factor, a parameter, a score, and the like. Embodiments can further include returning, for each face of the one or more faces, a horizontal alignment score, wherein the horizontal alignment score represents a probability that each face is horizontally aligned with the face identification sensor. The probability that each face is horizontally aligned with the face identification sensor can decrease as the face rotates farther from looking at the camera to looking to the side of the camera. Other embodiments can include determining a vertical rotation of each face, wherein the vertical rotation is based on a ratio of a distance between the nose and a left eye or a right eye. The rotation of the face can include both vertical rotation and horizontal rotation. A factor, parameter, score, and so on can be determined and delivered to indicate an amount of vertical rotation. Further embodiments can include delivering, for each face of the one or more faces, a vertical alignment score, wherein the vertical alignment score represents the probability that each face is vertically aligned with the face identification sensor. Since a face can be both horizontally and vertically rotated, both a horizontal alignment score and a vertical alignment score can be returned.

Figure 8:
FIG. 8 is an apparatus for a low-resolution embedded face sensor with machine learning.
Figure 8:
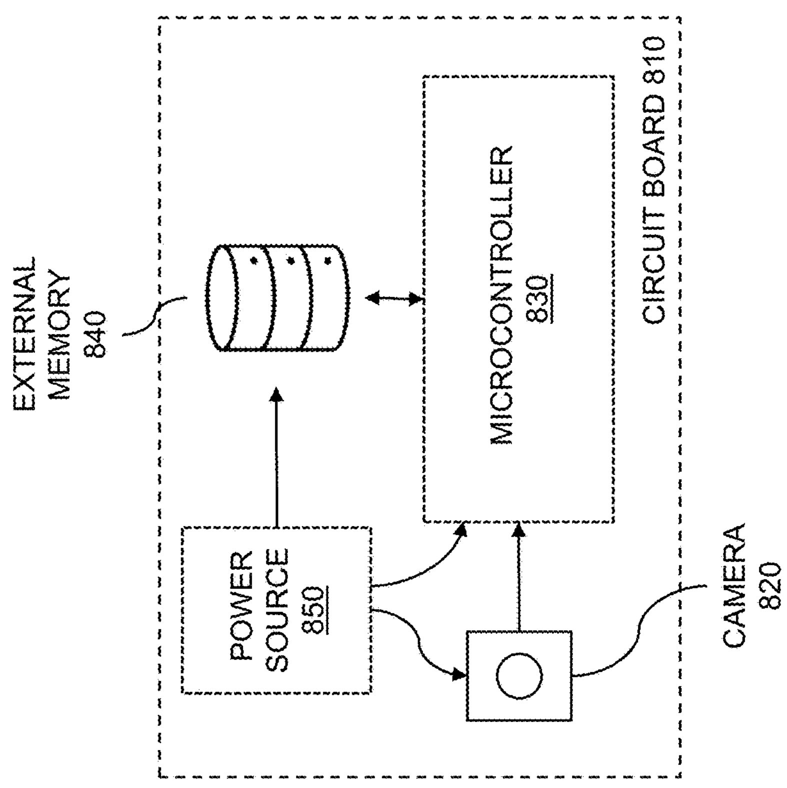

FIG. 8 is an apparatus for a low-resolution embedded face sensor with machine learning. The apparatus can capture images in which one or more faces can be detected. The faces can be detected using a neural network. The neural network can be configured to implement a machine learning model, where the machine learning model can be trained to detect one or more faces in an image. The faces can be recognized using a second neural network. The second neural network can be configured to implement a second machine learning model, where the second machine learning model can recognize a face based on a face identification. A face that is recognized with a low degree of confidence can be saved to an external memory. The apparatus can include a small form-factor, which enables the low-resolution embedded face sensor to be applicable to a variety of image collection and face recognition applications. The low-resolution embedded face sensor with machine learning enables sensing faces. One or more images are collected by a face identification sensor, wherein the face identification sensor includes a low-resolution camera, wherein the face identification sensor includes a microcontroller and an external memory, and wherein at least two machine learning models operate simultaneously on the microcontroller. A first neural network operating on the microcontroller detects one or more faces in the image that was captured, wherein the detecting includes a first confidence score associated with each face in the one or more faces. A second neural network operating on the microcontroller recognizes the one or more faces, wherein the recognizing is based on a face ID. A second confidence score is assigned to each of the one or more faces that were recognized. The face ID is saved, wherein the second confidence score that was assigned is below a threshold.

The apparatus 800 can include a circuit board 810. The circuit board can include a two-layer circuit board, a multi-layer circuit board, a flexible circuit board, and so on. The circuit board can be associated with a variety of form factors such as square, rectangular, circular, and the like. The apparatus 800 can include a camera 820, where the camera can be located on the printed circuit board. The camera can include a black and white or grayscale camera, a color (e.g., RGB) camera, and the like. The camera can include a still camera, a video camera, etc. The camera can include a low-resolution camera. The low-resolution camera can capture an image, where the image can include a number of pixels. In embodiments, the low-resolution camera captures images comprising 340×220 pixels. The pixels can include various bit depths such as four bits, eight bits, etc. The apparatus 800 can include a microcontroller 830. The microcontroller can control the low-resolution camera, can process images captured by the low-resolution camera, and so on. The microcontroller can include an ultra-low-power microcontroller. The microcontroller can include one or more power consumption levels such as standby, low-power, full-power, etc. The microcontroller can include an architecture based on a bit width. The architecture can include an eight-bit architecture, a 16-bit architecture, and so on. The architecture associated with the microcontroller can include an architecture that enables execution of machine learning applications, where the machine learning applications can include machine learning models trained to detect faces, to recognize faces, etc. In embodiments, the low-resolution camera and the microcontroller that hosts at least two convolutional neural networks simultaneously can be used to identify one or more faces, based on interpreting output of the low-resolution camera, using the microcontroller.

The output of the low-resolution camera can include an array of pixels, where each pixel can include four bits, eight bits, and so on. The array of pixels can include clusters of pixels such as clusters of three pixels, where the clusters of pixels can represent color values such as RGB values. In embodiments, the interpreting output is based on creating a plurality of embeddings for each face of the one or more faces, wherein the embeddings represent facial features of each face, and wherein the plurality of embeddings comprises a vector of scalar values. Discussed previously and throughout, embeddings can include mappings from high-dimensional spaces to lower-dimensional spaces. The embeddings can include continuous values, where the continuous values can be represented in the vector of scalar values. The facial features for each face can include facial regions, facial landmarks, and the like. In embodiments, the facial landmarks can include a nose, a left side of a mouth, a right side of a mouth, a left eye, or a right eye of each face.

The apparatus 800 can include an external memory 840. The external memory can be used to store a variety of information such as captured images, face IDs, first and second confidence scores, and so on. The external memory can be used to store at least two machine learning models. The external memory can further include configuration information for the low-resolution and other elements associated with the low-resolution face sensor. The external memory can include a removable memory element. The external memory can include non-volatile memory such as flash memory, resistive RAM (ReRAM), and the like. The apparatus 800 can include a power source 850. The power source can include a variety of power sources such as one or more batteries, rechargeable batteries, a power supply that converts main power to a voltage and/or current appropriate to the components of the printed circuit board, a renewable power source, and so on. In embodiments, the power source can be connected to provide power to the printed circuit board, and the power source can be contained within, on, or next to the printed circuit board. The power source can include a built-in power source, an attached power source, a removable power source, a shared power source, etc.

Figure 9:
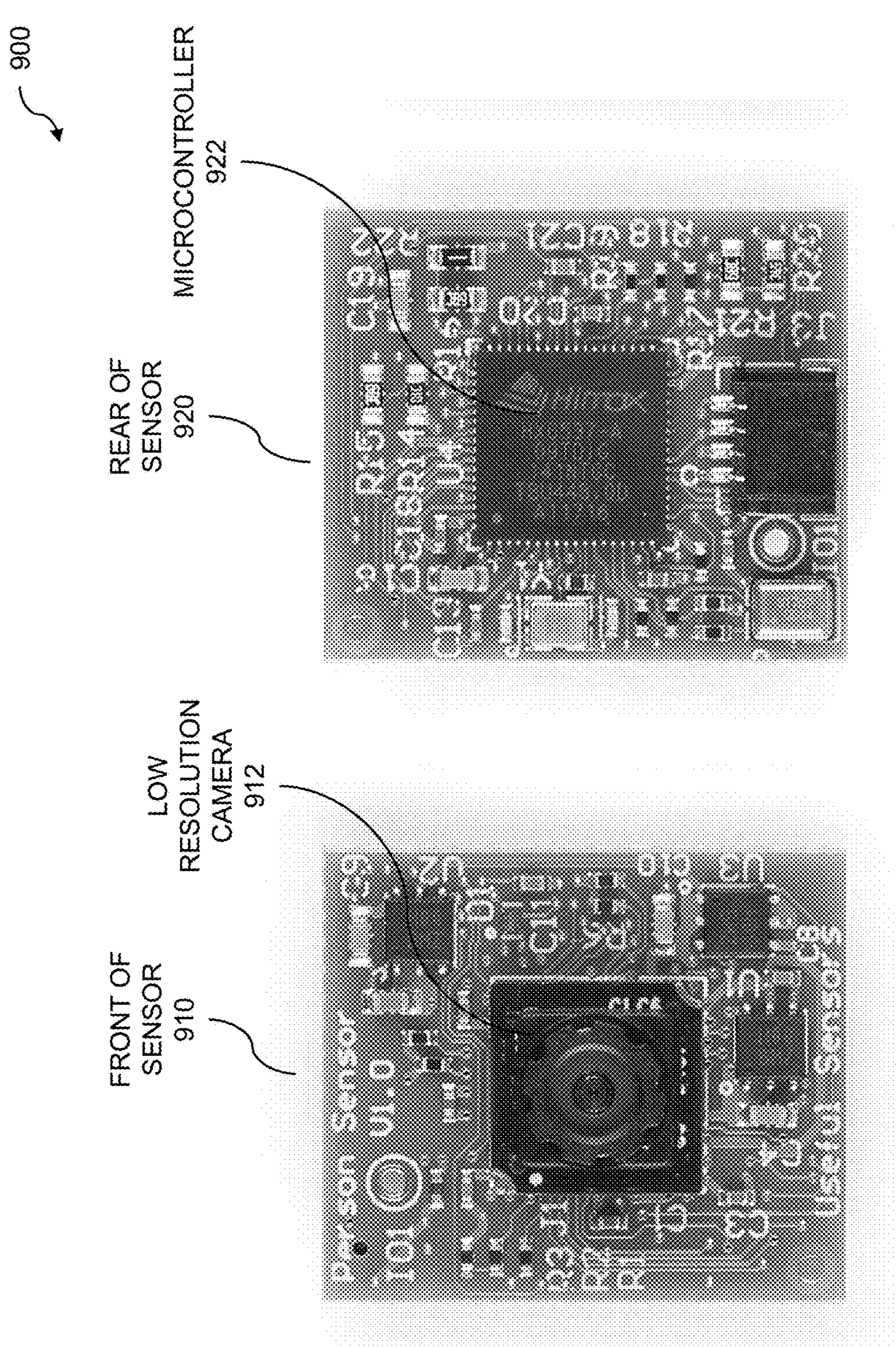
FIG. 9 is a low-resolution embedded face identification sensor apparatus with machine learning.

FIG. 9 is a low-resolution embedded face identification sensor apparatus with machine learning. A face identification sensor can be based on a low-resolution embedded face identification sensor. The face identification sensor can include a variety of elements that can be used to capture images such as low-resolution images and to determine whether one or more faces are present within an image. The presence or absence of one or more faces in an image can be based on a confidence score. Images that are likely to include faces can be processed to determine whether a face is recognized. Recognition of a face can be based on a second confidence score. When a high second confidence score is determined, then the recognized face can be used to provide access, enable features, and the like. The sensing faces is enabled by an apparatus for low-resolution embedded face identification sensing with machine learning. A low-resolution camera is located on a printed circuit board. The low-resolution camera is mounted to collect images of faces in a vicinity of the printed circuit board. A microcontroller is mounted to the printed circuit board, wherein the microcontroller hosts at least two convolutional neural networks simultaneously, and wherein the microcontroller is coupled to the low-resolution camera. An external memory is mounted to the printed circuit board. The external memory is coupled to the microcontroller. A power source is connected to provide power to the printed circuit board, and the power source is contained within, on, or next to the printed circuit board.

The low-resolution embedded face identification sensor apparatus 900 can enable a processor-implemented method for sensing faces. One or more images are captured by a face identification sensor, wherein the face identification sensor includes a low-resolution camera, wherein the face identification sensor includes a microcontroller and an external memory, and wherein at least two machine learning models operate simultaneously on the microcontroller. A first neural network operating on the microcontroller detects one or more faces in the image that was captured, wherein the detecting includes a first confidence score associated with each face in the one or more faces. A second neural network operating on the microcontroller recognizes the one or more faces, wherein the recognizing is based on a face ID. A second confidence score is assigned to each of the one or more faces that were recognized. The face ID is saved to the external memory, wherein the second confidence score that was assigned is below a threshold.

The FIG. 900 shows a front side 910 of the low-resolution embedded face identification sensor. The sensor can include one or more elements such as electronic elements on the front side of the sensor. In embodiments, a low-resolution camera 912 can be located on the front of the circuit board. The low-resolution camera can include a black and white or grayscale camera, a red-green-blue (RGB) camera, and so on. The camera can include a still camera, a video camera, etc. The low-resolution camera can include various resolutions, where the resolutions can be based on a number of pixels. Each pixel can be associated with a number of bits or a "bit depth", such as four bits, eight bits, and so on. In embodiments, the low-resolution camera can capture images comprising 340×220 pixels. The FIG. 900 further shows a back side 920 of the low-resolution embedded face identification sensor. Additional electronic components can be included on the back side of the sensor. In embodiments, the components can include a microcontroller 922. The microcontroller can comprise an architecture based on a number of bits such as an eight-bit, sixteen-bit, etc. architecture. The microcontroller can include an ultra-low power microcontroller. The microcontroller can operate in various power modes such as sleep, low-power, high-performance, etc. The microcontroller can be powered by a variety of power sources such as a battery or an internal or external power supply. The microcontroller can be based on an architecture which is configured to execute machine learning applications.

Figure 10:
FIG. 10 illustrates a low-resolution embedded face identification sensor apparatus with machine learning at scale.
Figure 10:
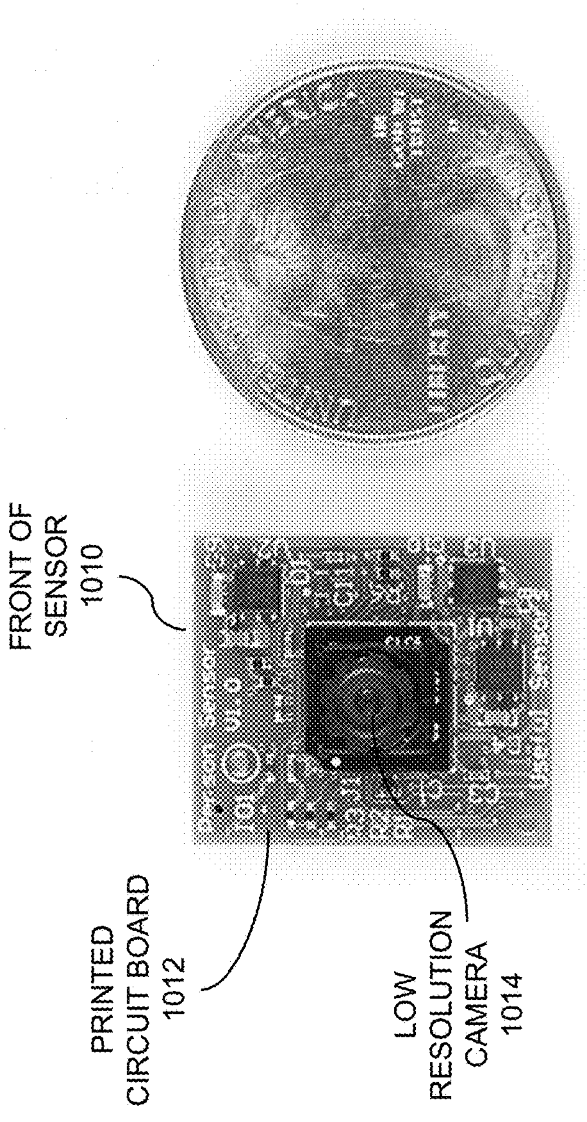

FIG. 10 illustrates a low-resolution embedded face identification sensor apparatus with machine learning at scale 1000. Described previously and throughout, the face identification sensor can capture one or more images such as facial images. The face identification sensor can capture images using a low-resolution camera included with the face identification sensor. The low-resolution camera can be mounted on a printed circuit board. The printed circuit board can include a board of substantially diminutive proportions. The diminutive proportions of the board enable easy mounting of the board for a variety of sensing applications. The low-resolution embedded face identification sensor uses machine learning for sensing faces. A low-resolution camera is located on a printed circuit board, wherein the low-resolution camera is mounted to collect images of faces in a vicinity of the printed circuit board. A microcontroller is mounted to the printed circuit board, wherein the microcontroller hosts at least two convolutional neural networks simultaneously, and wherein the microcontroller is coupled to the low-resolution camera. An external memory is mounted to the printed circuit board and the external memory is coupled to the microcontroller. A power source is connected to provide power to the printed circuit board, and the power source is contained within, on, or next to the printed circuit board.

The figure illustrates the front 1010 a low-resolution embedded face identification sensor apparatus adjacent to a United States quarter dollar coin. The diameter of the coin is 24.26 mm or 0.995 inches. The width and the height of the sensor are substantially similar to the diameter of the quarter dollar coin. The front of the low-resolution embedded face identification sensor comprises a circuit board 1012. A plurality of elements such as electronic elements can be coupled to the front of the circuit board. In embodiments, the face identification sensor includes a low-resolution camera 1014. The images captured by the low-resolution camera can include a plurality of pixels. In embodiments, the low-resolution camera can capture images comprising 340×220 pixels. Discussed throughout, the low-resolution images can be stored in an external memory. In order to conserve storage space in the external memory, the low-resolution images can be resized. Embodiments can include resizing the one or more images into a square grid. The resizing can be accomplished without a loss of facial data by cropping a captured image. The resizing or cropping can center a face detected within a captured image. The resizing can be based on a bounding box.

Figure 11:
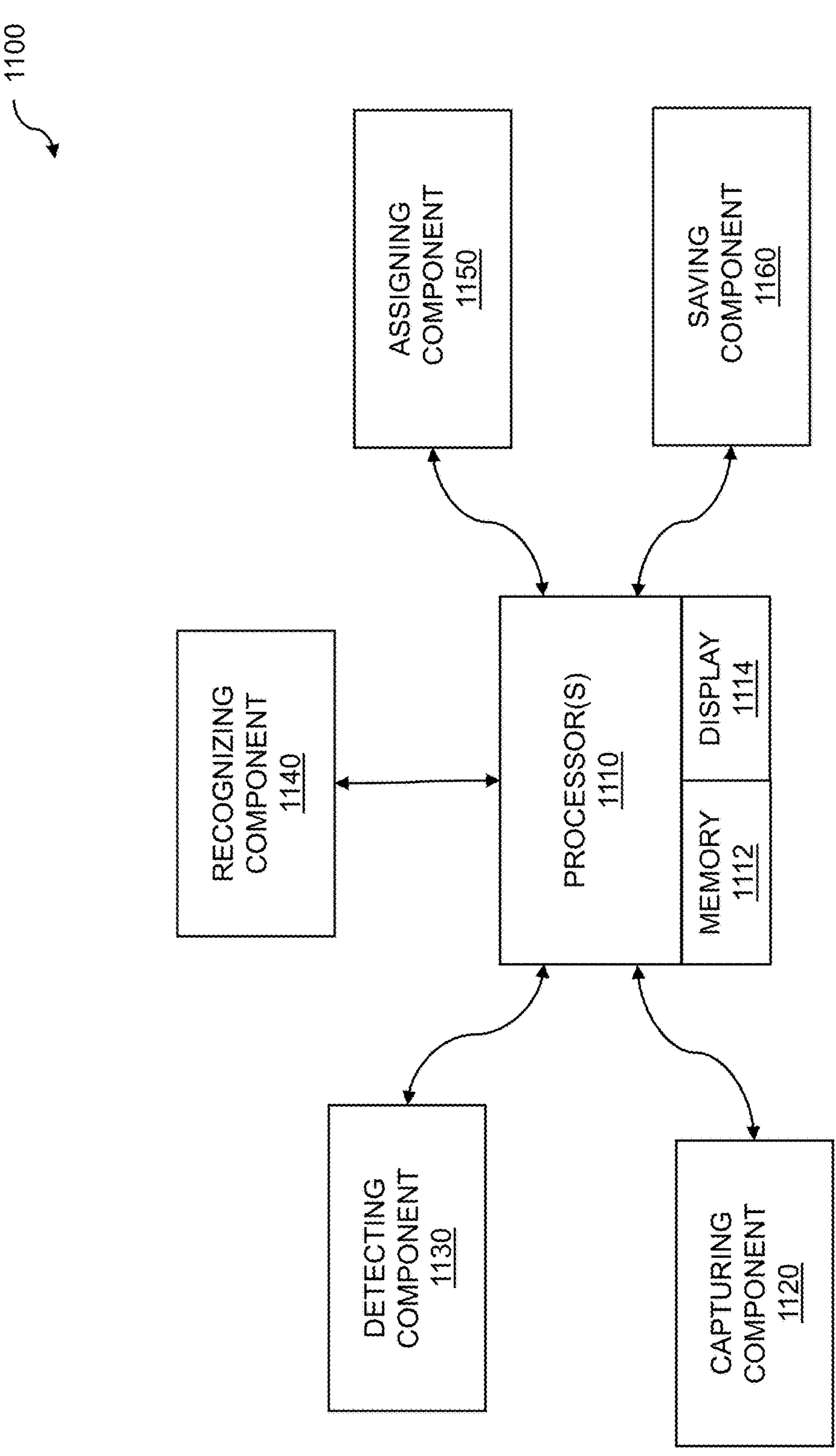
FIG. 11 is a system diagram for a low-resolution embedded face identification sensor with machine learning.

FIG. 11 is a system diagram for sensing faces. The sensing faces is enabled by a low-resolution embedded face identification sensor with machine learning. The system 1100 can include one or more processors 1110, which are coupled to a memory 1112, such as an external memory which stores instructions. The system 1100 can further include a display 1114 coupled to the one or more processors 1110 for displaying data, intermediate steps, machine learning models, facial images, first confidence scores, second confidence scores, thresholds, and so on. In embodiments, one or more processors 1110 are coupled to the memory 1112, wherein the one or more processors, when executing the instructions which are stored, are configured to: capture one or more images by a face identification sensor, wherein the face identification sensor includes a low-resolution camera, wherein the face identification sensor includes a microcontroller and an external memory, and wherein at least two machine learning models operate simultaneously on the microcontroller; detect, by a first neural network operating on the microcontroller, one or more faces in the image that was captured, wherein the detecting includes a first confidence score associated with each face in the one or more faces; recognize, by a second neural network operating on the microcontroller, the one or more faces, wherein the recognizing is based on a face ID; assign a second confidence score to each of the one or more faces that were recognized; and save, to the external memory, the face ID, wherein the second confidence score that was assigned is below a threshold.

The system 1100 can include a capturing component 1120. The capturing component 1120 can include logic and functions for capturing one or more images by a face identification sensor. The face identification sensor can capture images using one or more bandwidths of light such as visible light, infrared (IR) light, and so on. In embodiments, the face identification sensor includes a low-resolution camera. The low-resolution camera can include a black and white or grayscale camera, a color camera, and the like. In embodiments, the low-resolution camera can capture images comprising 340×220 pixels. Other pixel resolutions can also be used. The pixels can include a number of bits such as eight bits. Other elements can be associated with the capturing component. In embodiments, the face identification sensor includes a microcontroller and an external memory. The microcontroller can be used to configure and control the camera, to process image data collected from the camera, etc. The external memory can include a read-write memory (RAM). The external memory can include a non-volatile memory such as flash memory, resistive RAM (ReRAM), etc. In embodiments, at least two machine learning models operate simultaneously on the microcontroller. The at least two machine learning models can be trained using one or more training datasets. The training datasets can include images such as facial images that have been labeled or tagged for the presence or absence of one or more faces. The machine learning models can be trained to detect facial regions, facial landmarks, etc.

The system 1100 can include a detecting component 1130. The detecting component 1130 can include logic and functions for detecting, by a first neural network operating on the microcontroller, one or more faces in the image that was captured. The one or more faces can be located at substantially similar distances from the face identification sensor, substantially different distances, and the like. Further embodiments include determining if each face of the one or more faces is looking at the low-resolution camera. A face among the one or more faces can be gazing substantially in the direction of the face ID sensor, rotated to the left or right, rotated up or down, etc. The neural network can include a network trained to detect faces. As discussed previously and throughout, the training can be accomplished using labeled training data. The labeled training data can be generated by human experts, a generative neural network that can produce synthetic training data, etc. The neural network can include a convolutional neural network. In embodiments, the detecting includes a first confidence score associated with each face in the one or more faces. The confidence score can include a numerical score, a percentage, a relative "score" such as likely or unlikely, etc. In embodiments, the detecting can further include creating, for each face of the one or more faces, a bounding box, wherein the first confidence score represents a confidence that the bounding box bounds a face. The bounding box can be used to constrain an amount of data associated with a face in order to simplify the processing of facial images. In embodiments, a size of the bounding box can correlate to a distance to the face identification sensor. The distance from the face to the face ID sensor can include a distance within the focal length of the sensor. The distance can include a few centimeters, tens of centimeters, hundreds of centimeters, a meter, etc.

Further embodiments can include extracting landmark locations from each face of the one or more faces. The landmark locations include a nose, a left side of a mouth, a right side of a mouth, a left eye, or a right eye of each face. The landmark locations can further include left and right corner of each eye, eyebrows, ears, chin, and so on. Facial regions can also be extracted for each of the one or more faces. Discussed previously, the detecting can include a rotation of each face. Further embodiments can include determining a horizontal rotation of each face, wherein the horizontal rotation is based on a ratio of a distance between the nose and a left or a right side of the mouth. The distance between the nose and the sides of the mouth will appear to change based on the amount of rotation of the face. The amount of rotation can be characterized. Further embodiments include returning, for each face of the one or more faces, a horizontal alignment score. The horizontal alignment score represents a probability that each face is horizontally aligned with the face identification sensor. In addition to determining a horizontal rotation, a vertical rotation can also be determined. Embodiments can include determining a vertical rotation of each face, wherein the vertical rotation is based on a ratio of a distance between the nose, and a left eye or a right eye. As a face rotates up or down, the distance between the nose and an eye can change. The distance between the nose and the left eye, and the nose and the right eye can change when the face is vertically and horizontally rotated. Embodiments can further include delivering, for each face of the one or more faces, a vertical alignment score, wherein the vertical alignment score represents the probability that each face is vertically aligned with the face identification sensor. In a usage example, a high vertical or horizontal score can indicate a probability that a face is aligned vertically or horizontally with the face identification sensor, while low scores can indicate poor alignment with respect to the camera.

The system 1100 can include a recognizing component 1140. The recognizing component 1140 can include logic and functions for recognizing, by a second neural network operating on the microcontroller, the one or more faces. The second neural network can be trained to determine or calculate one or more features, characteristics, and so on, associated with the face. In embodiments, the recognizing is based on a face ID. The face ID can be based on a saved face, a comparison of facial characteristics, etc. The face ID can be based on a score, a probability, and the like. In embodiments, the recognizing can further include creating, by the second neural network, a plurality of embeddings for each face of the one or more faces. The embeddings represent facial features of each face, wherein the plurality of embeddings comprises a vector of scalar values. An embedding can include a mapping of a discrete variable to a vector, where the vector can comprise continuous values. An embedding can transform a high dimensionality space to a low dimensionality space. The low dimensionality space can simplify processing and analysis. The processing and analysis can be applied to the face recognition. Embodiments can include clustering embeddings within the plurality of embeddings that were created for each face of the one or more faces. The clustering can be based on finding nearest neighbors within an embedding space. Embodiments can include calculating, for each face of the one or more faces, a center of the embeddings that were clustered. Calculating the center of the embeddings can include calculating a centroid of the plurality of embeddings. The calculating the center of the embeddings can include calculating a geographic center of the embeddings.

The system 1100 can include an assigning component 1150. The assigning component 1150 can include logic and functions for assigning a second confidence score to each of the one or more faces that were recognized. The second confidence score can be based on a value, a percentage, a probability, and so on. The assigning can also include assigning a face ID. Embodiments can further include assigning, to each face of the one or more faces, the face ID and the second confidence score, wherein the face ID and the second confidence score can be based on a cosine of an angle between geographic centers of the embeddings. The assigning the face ID and the second confidence score can be accomplished using the microcontroller and external memory included with the low-resolution camera. A face ID can be assigned to each detected face. In embodiments, the face ID can be limited to one of eight values. Other numbers of face ID values, such as 16 values, 32 values, etc., can be assigned. Embodiments can include matching the face ID with one or more values stored in the external memory. The matching can be based on an exact match, a relative match, a percent match, and the like.

The system 1100 can include a saving component 1160. The saving component 1160 can include logic and functions for saving, to the external memory, the face ID, wherein the second confidence score that was assigned is below a threshold. Recall that the second confidence score can be based on recognizing a face in an image. If the second confidence score is low or below a threshold, the face was not recognized, was recognized with low confidence, and the like. Such a face can include a "new" face. Thus, the new face can be saved to the external memory. Recognition of faces that have been captured previously by the face identification sensor can be improved. The improvement can be accomplished by capturing additional images in which the face has been detected. Improvements to recognizing new faces can also be accomplished with calibration. Further embodiments can include calibrating the face identification sensor. The calibrating stores a new face. The calibrating can be accomplished by capturing or collecting a plurality of images. In embodiments, the calibrating can further include collecting a series of images, over time, of a new face. The collecting images can include collecting images that include facial landmarks associated with the face. The collecting can include embeddings for each image of the series of images. The embeddings associated with the new face can be processed and analyzed as were the embeddings associated with previously saved faces. Embodiments can include clustering the embeddings for each image of the series of images. The clustering can include finding a geographic center of the embeddings. Further embodiments can include determining the average of the clustering. The average of the clustering can be determined by the microcontroller included in the facial identification sensor.

The system 1100 can include a computer program product embodied in a non-transitory computer readable medium for sensing faces, the computer program product comprising code which causes one or more processors to perform operations of: capturing one or more images by a face identification sensor, wherein the face identification sensor includes a low-resolution camera, wherein the face identification sensor includes a microcontroller and an external memory, and wherein at least two machine learning models operate simultaneously on the microcontroller; detecting, by a first neural network operating on the microcontroller, one or more faces in the image that was captured, wherein the detecting includes a first confidence score associated with each face in the one or more faces; recognizing, by a second neural network operating on the microcontroller, the one or more faces, wherein the recognizing is based on a face ID; assigning a second confidence score to each of the one or more faces that were recognized; and saving, to the external memory, the face ID, wherein the second confidence score that was assigned is below a threshold.

The system 1100 can comprise an apparatus for sensing faces comprising: a low-resolution camera located on a printed circuit board, wherein the low-resolution camera is mounted to collect images of faces in a vicinity of the printed circuit board; a microcontroller, wherein the microcontroller is mounted to the printed circuit board, wherein the microcontroller hosts at least two convolutional neural networks simultaneously, and wherein the microcontroller is coupled to the low-resolution camera; an external memory, wherein the external memory is mounted to the printed circuit board and wherein the external memory is coupled to the microcontroller; and a power source, wherein the power source is connected to provide power to the printed circuit board, and where the power source is contained within, on, or next to the printed circuit board.

Each of the above methods may be executed on one or more processors on one or more computer systems. Embodiments may include various forms of distributed computing, client/server computing, and cloud-based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams show functions, steps, or groups of steps of the methods, apparatus, systems, computer program products and/or computer-implemented methods. Any and all such functions generally referred to herein as a "circuit," "module," or "system" may be implemented by computer program instructions, by special-purpose hardware-based computer systems, by combinations of special purpose hardware and computer instructions, by combinations of general-purpose hardware and computer instructions, and so on.

A programmable apparatus which executes any of the above-mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are limited to neither conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM); an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States, then the method is considered to be performed in the United States by virtue of the causal entity.

While the invention has been disclosed in connection with preferred embodiments shown and described in detail, various modifications and improvements thereon will become apparent to those skilled in the art. Accordingly, the foregoing examples should not limit the spirit and scope of the present invention; rather it should be understood in the broadest sense allowable by law.

What is claimed is:

1. A processor-implemented method for sensing faces comprising:

capturing one or more images by a face identification sensor, wherein the face identification sensor includes a low-resolution camera, wherein the face identification sensor includes a microcontroller and an external memory, and wherein at least two machine learning models operate simultaneously on the microcontroller;

detecting, by a first neural network operating on the microcontroller, one or more faces in the image that was captured, wherein the detecting includes a first confidence score associated with each face in the one or more faces, wherein the detecting further comprises creating, for each face of the one or more faces, a bounding box, wherein the first confidence score represents a confidence that the bounding box bounds a face;

extracting landmark locations from each face of the one or more faces, wherein the landmark locations include a nose, a left side of a mouth, a right side of a mouth, a left eye, or a right eye of each face;

recognizing, by a second neural network operating on the microcontroller, the one or more faces, wherein the recognizing is based on a face ID;

assigning a second confidence score to each of the one or more faces that were recognized; and saving, to the external memory, the face ID, wherein the second confidence score that was assigned is below a threshold.

2. The method of claim 1 wherein a size of the bounding box correlates to a distance to the face identification sensor.

3. The method of claim 1 further comprising determining if each face of the one or more faces is looking at the low-resolution camera.

4. The method of claim 3 further comprising determining a horizontal rotation of each face, wherein the horizontal rotation is based on a ratio of a distance between the nose, and a left or a right side of the mouth.

5. The method of claim 4 further comprising returning, for each face of the one or more faces, a horizontal alignment score, wherein the horizontal alignment score represents a probability that each face is horizontally aligned with the face identification sensor.

6. The method of claim 3 further comprising determining a vertical rotation of each face, wherein the vertical rotation is based on a ratio of a distance between the nose, and a left eye or a right eye.

7. The method of claim 6 further comprising delivering, for each face of the one or more faces, a vertical alignment score, wherein the vertical alignment score represents a probability that each face is vertically aligned with the face identification sensor.

8. The method of claim 1 wherein the recognizing further comprises creating, by the second neural network, a plurality of embeddings for each face of the one or more faces, wherein the embeddings represent facial features of each face, and wherein the plurality of embeddings comprises a vector of scalar values.

9. The method of claim 8 further comprising clustering embeddings within the plurality of embeddings that were created for each face of the one or more faces.

10. The method of claim 9 further comprising calculating, for each face of the one or more faces, a center of the embeddings that were clustered.

11. The method of claim 10 further comprising assigning, to each face of the one or more faces, the face ID and the second confidence score, wherein the face ID and the second confidence score are based on a cosine of an angle between geographic centers of the embeddings.

12. The method of claim 11 wherein the face ID is limited to one of eight values.

13. The method of claim 11 further comprising matching the face ID with one or more values stored in the external memory.

14. The method of claim 1 wherein the low-resolution camera captures images comprising 340×220 pixels.

15. The method of claim 1 further comprising resizing the one or more images into a square grid.

16. The method of claim 1 further comprising calibrating the face identification sensor, wherein the calibrating stores a new face.

17. The method of claim 16 wherein the calibrating further comprises collecting a series of images over time of a new face, wherein the collecting includes embeddings for each image of the series of images.

18. The method of claim 17 further comprising clustering the embeddings for each image of the series of images.

19. The method of claim 18 further comprising determining an average of the clustering.

20. The method of claim 1 wherein the second confidence score represents a confidence that each of the one or more faces was recognized.

21. A computer system for sensing faces comprising:
an external memory which stores instructions;
one or more processors coupled to the external memory, wherein the one or more processors, when executing the instructions which are stored, are configured to:
capture one or more images by a face identification sensor, wherein the face identification sensor includes a low-resolution camera, wherein the face identification sensor includes a microcontroller and an external memory, and wherein at least two machine learning models operate simultaneously on the microcontroller;
detect, by a first neural network operating on the microcontroller, one or more faces in the image that was captured, wherein the detecting includes a first confidence score associated with each face in the one or more faces, wherein the detecting further comprises creating, for each face of the one or more faces, a bounding box, wherein the first confidence score represents a confidence that the bounding box bounds a face;
extract landmark locations from each face of the one or more faces, wherein the landmark locations include a nose, a left side of a mouth, a right side of a mouth, a left eye, or a right eye of each face;
recognize, by a second neural network operating on the microcontroller, the one or more faces, wherein the recognizing is based on a face ID;
assign a second confidence score to each of the one or more faces that were recognized; and
save, to the external memory, the face ID, wherein the second confidence score that was assigned is below a threshold.

* * * * *